United States Patent

Kleefisch et al.

[11] Patent Number: 5,160,632
[45] Date of Patent: Nov. 3, 1992

[54] CYANIDE REMOVAL FROM COKE OVEN WASH WATERS

[75] Inventors: Jeffery L. Kleefisch, Valparaiso, Ind.; Vincent G. Spaeth, Downers Grove, Ill.

[73] Assignee: Nalco Chemical Company, Naperville, Ill.

[21] Appl. No.: 849,570

[22] Filed: Mar. 11, 1992

[51] Int. Cl.$^5$ .............................................. C02F 1/58
[52] U.S. Cl. ................................ 210/724; 210/732; 210/734; 210/904; 55/84; 55/89; 423/367
[58] Field of Search ............... 210/724, 732, 734, 750, 210/904; 55/54, 84, 89; 423/140, 367

[56] References Cited

U.S. PATENT DOCUMENTS

| | | | |
|---|---|---|---|
| 259,908 | 6/1882 | Parsons et al. | 423/367 |
| 465,600 | 12/1891 | Rowland | 423/367 |
| 3,141,733 | 7/1964 | Broisman | 423/367 |
| 3,847,807 | 11/1974 | Herman et al. | 210/904 |
| 4,312,760 | 1/1982 | Neville | 210/904 |

FOREIGN PATENT DOCUMENTS

| | | | |
|---|---|---|---|
| 3317 | 1/1972 | Japan | 210/904 |
| 21667 | 3/1973 | Japan | 210/904 |
| 247809 | 10/1987 | Japan | 210/904 |

Primary Examiner—Stanley S. Silverman
Assistant Examiner—Neil M. McCarthy
Attorney, Agent, or Firm—Robert A. Miller; Joseph B. Barrett

[57] ABSTRACT

A process for removing cyanide anions from waste waters using halogen-free ferric salts is disclosed. The process is particularly effective when treatment of cyanide waste waters is done by adding ferric sulfate while adjusting pH of the waste waters with a halogen-free acid, such as sulfuric acid, to a pH ranging from about 3.0 to 5.0.

The ferric ferricyanides formed are agglomerated and flocculated using synthetic polymers along with whatever other dispersed or suspended solids may be present in the waste waters, and this dense sludge is separated in a clarifier. Cyanide removal is at least 80%, relative to initial cyanide concentrations, and preferably 90% removal or higher.

Cyanide wastes from coke oven off gas scrubbing waters are particularly waste waters amenable to this treatment.

5 Claims, 2 Drawing Sheets

CYANIDE REMOVAL FROM COKE OVEN WASH WATERS

The art has taught that the removal of the toxic cyanide ion from waste waters is beneficial. These waste waters can include waste waters from mining operations, from plating operations, from various stripping operations, from various washing, scrubbing or flushing waters that are used to wash chemical process off gases that contain various contaminants, including cyanide, for example the off gases obtained from coke oven batteries operating to manufacture coke used in steel mills.

A number of techniques have been used for cyanide treatment, which techniques include but are not limited to biomass treatment, chemical oxidation, such as the use of potassium permanganate, chlorine, and ozone, and the like. It has also been known that certain metal ions, particularly iron, form complexes with cyanide, which complexes can be soluble or insoluble in water and which complexes are highly colored. However, some of these soluble or partially soluble complexes would not lead to removal of cyanide from waters through a sludge or precipitating process.

Therefore, it is an object of this invention to treat cyanide contaminated waters to remove cyanide therefrom by precipitating a metal cyanide complex which is totally insoluble in the waste waters and which complex passes recognized leach tests and may be safely used in a landfill.

It is further an object of this invention to treat cyanide contaminated waters containing from about 5 to about 1,000 parts per million cyanide to remove at least 80, and preferably at least 90% of this cyanide through a process as described above.

THE INVENTION

Figure 1:
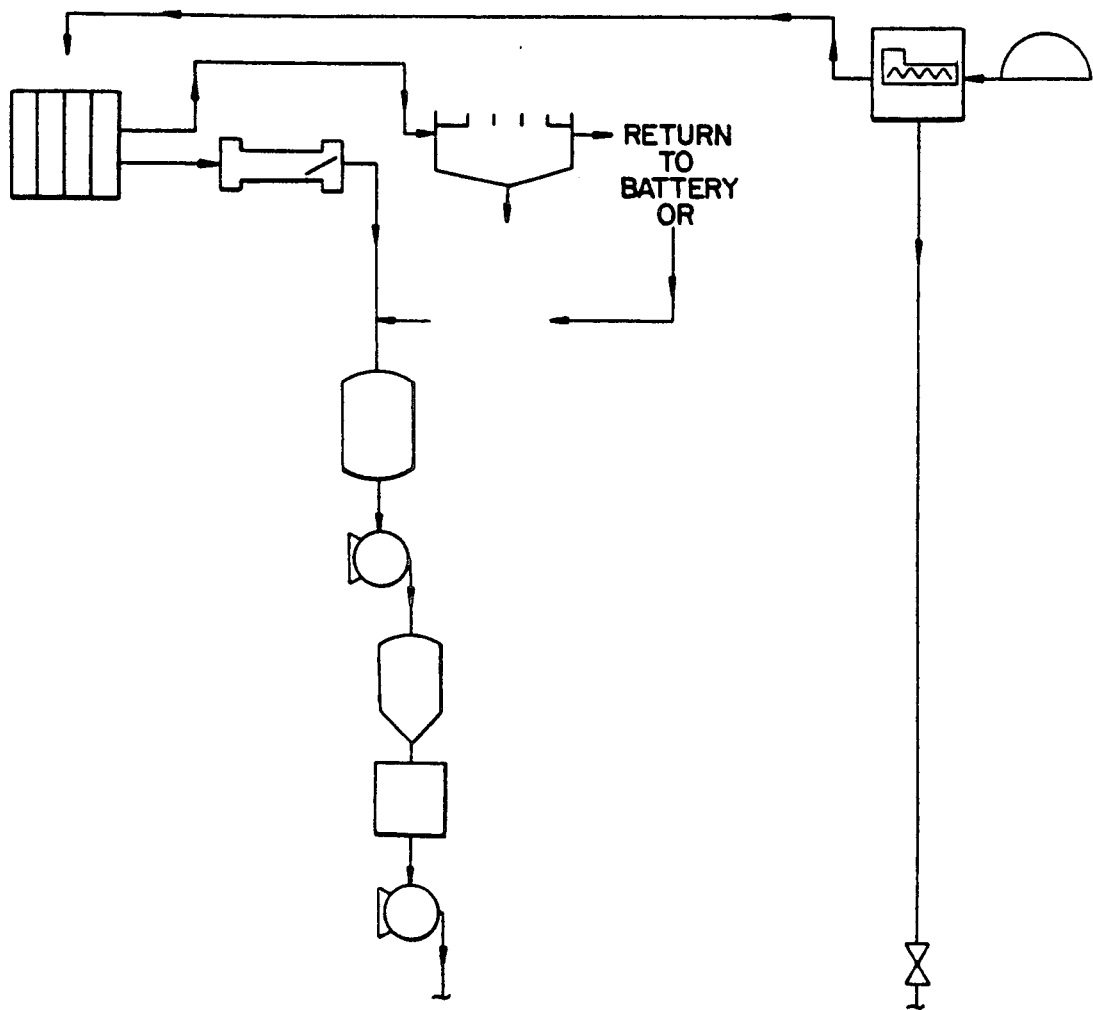
FIG. 1 provides a simple flow diagram of the process described for treating coke oven off gases, and the washing flushing liquors obtained therefrom, in the manners described above.
Figure 1:
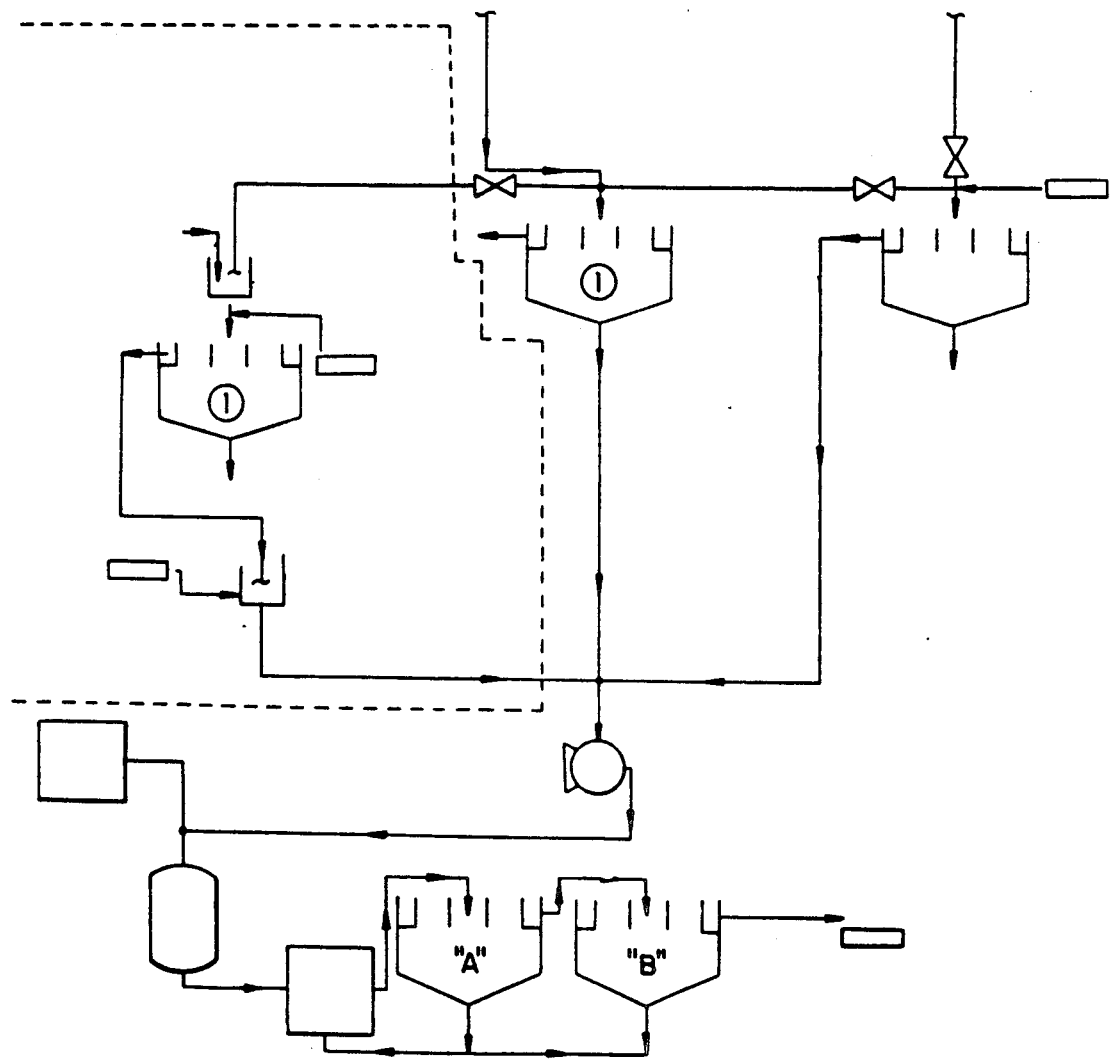

We have invented a process to remove cyanide from an initial cyanide contaminated waste water containing from about 5 to about 1,000 parts per million cyanide which process comprises:

a) Adjusting the pH of said waters in a containment vessel, with mixing, to a pH of from about 3.0 to about 5.0; while;

b) Adding thereto in the same containment vessel, an effective cyanide removing amount of a water soluble halogen-free ferric iron salt; thereby forming a pH adjusted ferricyanide salt containing waste water; then c) mixing said pH adjusted, ferricyanide salt containing water in the containment vessel for at least five minutes thereby forming a ferricyanide salt precipitated waste liquor, and then (d) charging the precipitated waste liquor to a clarifier while adding thereto a high molecular weight water soluble polymeric flocculant, thereby forming a flocculated ferricyanide containing sludge in the clarified liquor, said clarified liquor containing no more than 20% of the cyanide contained in the initial cyanide contaminated waste waters, (e) removing said flocculated sludge from said clarified liquor, and (f) discharging said treated clarified liquor.

In our process, the pH of the initial cyanide contaminated waters, which pH may range from about 6.5 to about 11.5, is preferably adjusted to within about 3.5 to about 5.0 with a halogen-free inorganic acid. The halogen-free water soluble ferric iron salt is preferably ferric sulfate, and the halogen-free inorganic acid is preferably sulfuric acid.

The Iron Salts

The iron salt used to react with cyanide must be a ferric salt and should be free of halogen and capable of forming an aqueous solution containing at least 5 weight percent iron, preferably between 9 and 10 weight percent iron, as Fe, The preferred iron salt is ferric sulfate. This ferric sulfate is added to the contaminated waste waters containing cyanide as an aqueous solution of ferric sulfate and in such volume to provide a weight ratio of from 0.3:1 to about 50:1.0 of ferric iron to cyanide present in the waste waters.

Most preferably, the weight ratio of iron (as Fe) to cyanide ranges from about 0.5 to about 50:1.0 iron (Fe) to cyanide (CN).

In the most preferred range, sufficient iron is added so as to provide for the formation of ferric ferricyanide or what is sometimes referred to as Berlin green salt. This salt is insoluble in the waters being treated and can be easily flocculated and sludged from a clarifier, dewatered and discarded in a commercial landfill.

The Inorganic Acid

The acid used for pH adjustment is any inorganic halogen-free acid, but is most preferably sulfuric acid. The sulfuric acid is added in sufficient quantity and with appropriate pH control so as to provide a pH ranging from 3.0 to 5.0, most preferably providing a pH ranging from about 3.5–5.0, and the containment/reaction vessel in which the iron is reacting with cyanide is normally equipped with appropriate piping, pH monitoring and pumping means to provide for pH control at 4.5, ±0.3 pH units.

THE REACTION

The reaction with cyanide in the waste waters is a reaction that forms a ferricyanide complex, $[Fe(CN_6)]^{-3}$ which in various salt forms may be soluble, partially soluble or essentially insoluble, but as the ferric iron salt form is insoluble, sometimes referred to as Berlin's green, and is easily removed by flocculation from the treated waste streams. The ferric sulfate solution is added in quantities sufficient to provide a weight ratio of iron to cyanide ranging from about 0.3 to about 50 to 1. Most preferably, these ratios are between about 0.5 to about 50:1.0 iron to cyanide. In the most preferred operation of the practice of this invention, iron salt solutions are added to the cyanide contaminated waste waters at a sufficient rate to provide at least about 1% and preferably about 10% in excess of stoichiometry based on the formation of Berlin's green; Fe (Fe (CN)$_6$).

The pH must be controlled at about a pH of 4.5±1.0, preferably 4.5±0.5, and most preferably at 4.5±0.3 pH units. The pH is controlled by using a PID controller with appropriate pH measuring means and feedback of the measured pH to control through the proportional integral/differentiation controller (P.I.D. controller) appropriate signals to provide for the acid feed into the reaction vessel mixture.

The iron solution used in the preferred operation of this invention is an iron solution containing from 45–50 weight percent $Fe_2(SO_4)_3$, which solution contains at least 9 weight percent iron, preferably from 9-10.0 weight percent iron as ferric iron. The reaction mixture is held in a mixed/reaction-containment vessel providing preferably 5 minute residence/reaction time and is normally preferably controlled at temperatures of 50° C., more preferably the temperature ranges from about 70° C. to about 105° C. Reaction times are most preferably between about 10-30 minutes.

After the reaction with ferric salts at the adjusted pH of about 4.5±0.5 as above taught, the effluent from the reaction vessel is treated with a high molecular weight flocculating polymer and then added to a clarifier, which clarifier is operating at the same pH range as the outflow from the reaction vessel.

THE FLOCCULATING POLYMER

The high molecular weight flocculating polymer normally has a weight average molecular weight of at least 10 million and may be chosen from a neutral or non-charged polymer, a cationic polymer, or an anionic polymer. Preferably, these flocculants are anionic polymers derived from acrylamide and acrylic acid, which polymers contain at least 5 weight percent acrylic acid and may contain as much as 25 weight percent acrylic acid. The preferred polymers have a molecular weight of at least 15 million and can be added in solution, as a solid, or most preferably are added as a water-in-oil emulsion, which emulsion readily inverts to easily form aqueous solutions of these flocculant polymers.

The cyanide containing sludges removed by the addition of the polymeric flocculant are collected from the bottom of this clarifier, dewatered, and tested for toxic leaching using the so-called "paint leach test". The materials passed this test providing for sludges which can safely be used in land fills.

Although ferric ferricyanide is believed to be the primary cyanide containing sludge, other sludges may also be formed in the process. These sludges can include but are not limited to ammonium ferricyanide, calcium ferricyanide, magnesium ferricyanide, ferro ferricyanide, and the like. These other cations can be found either in the waters originally used to scrub the off gases or can be purposefully added if appropriate. Operation of our system seems to indicate the formation of ferric ferricyanide waste sludges since a greenish color is observed.

To exemplify the use of our invention to remove cyanide from cyanide containing waste waters, our process was used to treat waste waters derived from spray washing off gases from a battery of coke ovens operating in a steel mill. After these coke ovens are charged with coal, they are heated to extreme temperatures to drive off materials from the coal to form coke, which coke is then useful in the manufacture of steel. In the process of forming coke, off gases are formed from the coke oven battery, which battery may contain from 30 to 50 individual coke ovens, or more. The off gases contain ammonia, hydrogen cyanide, hydrogen sulfide, organic sulfides, tars, organic liquors and organic volatile materials. These off gases also contain dispersed wherein finally divided coal, inorganic particulate, coke particles, and other unidentified particulate matter of finely divided nature. To remove the toxic materials contained in the off gases, they are normally flushed or sprayed with water using industrial waters of various character. Potable waters can be used, but would normally be too expensive. Industrial water sources, such as lake and river waters, are the normal source of the waters used in these flushing operations. The washing operation leads to what is referred to as a flushing liquor, which liquor then is phase separated in a decanter operation for the purpose of removing high molecular weight organic tars and other residue from the water phase. These decanters simply separate the water insoluble tars and residue and isolate the tars as a separate phase while passing through a flushing liquor which is essentially tar-free, although this flushing liquor may still contain some soluble organic and inorganic compounds, as well as finely divided insoluble dispersed materials.

The flushing liquor at this point may be referred to as a Still feed liquor, since the next operation may be the addition of this tar-free flushing liquor (or still feed liquor) to a stripping tower, said stripping tower fed live steam directly and also fed caustic, or sodium hydroxide, for pH adjustment. The pH is raised, by the addition of caustic to a pH ranging from about 9.0 to about 11.0, preferably from about 10-11, and encourages the removal of ammonia gases from the still liquors by direct steam stripping operation in the crude liquor still. The overhead from the crude liquor still contains predominantly ammonia but may also contain some hydrogen cyanide and $H_2S$. These materials are collected and treated separately.

The bottoms or the effluent from the crude liquor still contains from about 5 to about 150 parts per million cyanide, normally from about 10 to about 135 parts per million cyanide, and most normally between about 10 to about 50 parts per million cyanide. This still bottoms liquor has a pH ranging from about 9 to about 11 and is normally pumped or flows to a volume equalization pit which equalization pit is used for flow control, and also equalizes extremes in contaminant and/or cyanide concentrations. The equalization pit also allows for the separation of some remaining solids which may still be contained in the bottoms of the crude liquor still bottoms effluent.

The equalization pit is equipped with lift pumps, and the lift pumps then discharge this equalized crude liquor still effluent at a rate that may range from about 150,000 to about 500,000 gallons per day, and in at least one operating facility ranges from about 200,000 to about 500,000 gallons per day.

The crude liquor still effluent, after passing through the equalization pit, is then pumped into a containment and reaction vessel equipped with a mixer and also equipped with means to add the ferric iron solutions and acids at such controlled rates as to provide a pH of 3.0 to 5.0, preferably 3.5 to 4.5, and to provide the iron: Cyanide ratios above taught. The reaction containment vessel is of sufficient total volume to provide for a residence time of at least 5 minutes, preferably a residence/reaction time of from 10-30 minutes, and is operated at a temperature of preferably 50° C., more preferably at a temperature ranging from 70°-100° C.

To this reaction/containment vessel is added sufficient acid to control the pH within the above ranges and sufficient iron salts, in the ferric iron oxidation state, to provide the ratios above taught.

After the reaction is completed, a precipitated liquor that contains a ferricyanide salt, which is insoluble in this precipitated liquor, is then treated with a flocculant, as described above and added to a clarifier operating essentially within the same pH range of the reaction vessel. This clarifier, decanter, or phase separator is of sufficient volume and design to permit the separation of the ferricyanide containing flocculated sludge and the formation of a clarified waste liquor that contains from about 0.1 to about 5.0 parts per million cyanide, having thus removed at least 80% of the original cyanide and preferably at least 90% of the original cyanide contained in the initial cyanide contaminated waste waters.

In the steel mill operation, the overflow from this clarifier, which overflow stream is the clarified waste liquor containing from about 0.1–5.0 parts per million cyanide, is added to another vessel and pH adjusted by adding a basic solution, i.e. caustic, so that the pH ranges from about 9.0 to about 11.0, preferably ranging from about 10.0±0.5 pH units. This basic clarified waste liquor is then added to a biological aeration basin operating on various biological sludges, which sludges are specifically grown for the purpose of removing chemical oxygen demand and biological oxygen demand components and also specifically grown to treat and metabolize phenols to minimize phenol, thiocyanate, and ammonia contamination of the effluent. The outflow of the aeration basin is then added to one or more clarifiers, which separate suspended solids, including residue biological sludges which sludges are returned to the aeration basin. The effluent of the last clarifier used for final polishing is discharged to the environment.

In the tables below, the advantage of our invention is observed, particularly when iron is being added in the reaction containment vessel at a weight ratio relative to cyanide present ranging from about 0.5 to about 50 to 1.

As the tables demonstrate, the iron treatment using ferric sulfate salts can remove cyanides so as to obtain essentially 0.1 to 5 parts per million, even in the presence of upset amounts, i.e. above 50 ppm of cyanide contained in the crude liquor still effluent bottoms.

TABLE I

| NH3 | CN | PHN | SCN |
|---|---|---|---|
| INFLUENT | | | |
| 15.41 | 15.50 | 48.00 | 760.00 |
| LAKE DISCHARGE | | | |
| 30.560 | 3.50 | 0.052 | 4.8 |
| LAKE DISCHARGE FLOW (l/d) | | | |
| 402.100 | | | |

TABLE II

| NH3 | CN | PHN | SCN |
|---|---|---|---|
| INFLUENT | | | |
| 3.94 | 1.20 | 5.00 | 160.00 |
| LAKE DISCHARGE | | | |
| 1.380 | 1.60 | 0.001 | 2.0 |
| LAKE DISCHARGE FLOW (l/d) | | | |
| 1.211.00 | | | |

TABLE III

| NH3 | CN | PHN | SCN |
|---|---|---|---|
| INFLUENT | | | |
| 12.20 | 2.00 | 30.00 | 540.00 |
| LAKE DISCHARGE | | | |
| 1.060 | 1.60 | 0.008 | 2.0 |
| LAKE DISCHARGE FLOW (l/d) | | | |
| 1,144.800 | | | |

TABLE IV

| NH3 | CN | PHN | SCN |
|---|---|---|---|
| INFLUENT | | | |
| 11.57 | 2.10 | 8.00 | 470.00 |
| LAKE DISCHARGE | | | |
| 0.950 | 2.60 | 0.008 | 1.3 |
| LAKE DISCHARGE FLOW (l/d) | | | |
| 1,150.100 | | | |

TABLE V

| NH3 | CN | PHN | SCN |
|---|---|---|---|
| INFLUENT | | | |
| 14.99 | 2.00 | 8.00 | 540.00 |
| LAKE DISCHARGE | | | |
| 1.050 | 2.10 | 0.007 | 3.2 |
| LAKE DISCHARGE FLOW (l/d) | | | |
| 1,149.300 | | | |

In the absence of our ferric iron treatment within the 3.0–5.0 pH control range, the cyanide excursions, particularly when in excess of 50 parts per million, can decimate the biological sludges contained in aeration basis, such that these sludges are incapable of reacting with organic matter, phenols, and the like, and therefore, are incapable of controlling effluent quality thereby resulting in unacceptable cyanide discharge.

As the tables above demonstrate, we have particularly discovered an improved process of treating wash waters from coke oven off gases wherein the off gases are sprayed with industrial waters forming a flushing liquor containing tars, organics, ammonia, cyanides, sulfides, phenols and substituted phenols, thiocyanates, and inorganic waste products, which flushing liquors are added to a decanter system which system separates tars and organic materials thereby obtaining a tar-free flushing liquor. This flushing liquor has then added thereto an effective amount of sodium hydroxide to adjust the pH to from about 9.0 to about 11.0, which pH adjusted flushing liquor acts as feed to an ammonia stripping tower to which is added live steam for the purpose of stripping and removing ammonia overhead and providing a diluted steam strip tar-free flushing liquor having the following characteristic:

| | Parts per million | pH | Temperature |
|---|---|---|---|
| Cyanide | 5–150 ppm | 9.0–11.0 | at least 50° C. |
| COD | 5,000–20,000 ppm | | preferably between about 70° C.–110° C. |
| Ammonia | 20–4,000 ppm | | |
| Phenols | 5–100 ppm | | |
| Thiocyanate | 200–2,500 ppm | | |

This diluted and stripped flushing liquor is then added to a large volume equalization pit for the purpose of averaging contaminate concentrations, said pit equipped with lift pumps capable of pumping from about 500,000 to about 1 million gallons a day. These pumps remove the equalized flushing liquor from the equalization pit and pumps this liquor to a reaction vessel equipped with a stirrer and pH controls. This containment/reaction vessel provides for sufficient volume at the appropriate pumping rates to provide at least 5 minutes residence and reaction time. The reaction/containment vessel is equipped with a mixer and also equipped with means for piping and pumping ferric sulfate solution and concentrated sulfuric acid into the vessel to react with the cyanide contaminants contained in the liquors being treated therein. The pH is controlled at a pH of 3.0 to 5.0, again preferably from 3.5 to 4.5 using a pH controller and the appropriate PID controller controls. Ferric sulfate is added on the basis of the cyanide contained in the flushing liquor from the equalization pit. It is preferred to add at least 0.5 to 50:1.0 iron:cyanide weight ratios to control and precipitate cyanide from this equalized flushing liquor.

The precipitated flushing liquor having a pH from 3.0 to 5.0 is removed from the reaction vessel after reaction time of at least 5 minutes, preferably 10–30 minutes, and is treated with a high molecular weight flocculant prior to its addition to a clarifier system. The clarifier permits removal of sludge containing a ferric ferricyanide precipitate and permits an overflow of clarified liquor having the following characteristics:

|  | Parts per million | pH | Temperature |
|---|---|---|---|
| Cyanide | 0–5 ppm | 3.0–5.0 | about 50°–90° C. |
| COD | 1,000–20,000 ppm | | |
| Ammonia | 20–500 ppm | | |
| Phenols | 5–100 ppm | | |
| Thiocyanate | 200–2,000 ppm | | |

In the steel mill, the outflow of this clarifier is then further pH controlled by the addition of caustic to pH ranging from about 9.0 to about 11.0. Often a scale inhibitor, such as a low molecular weight acrylate polymer, for example, a homopolymer of acrylic acid having a molecular weight ranging from about 2,500 to about 50,000, or other typical industrially available scale inhibitors may be added at this point to control any calcium precipitates or any iron precipitates that form or other metal oxide or hydroxide when the pH is increased. The scale inhibitor is optional and is used only when scaling becomes a problem. The high molecular weight flocculants are preferably the flocculants described above, for example, an acrylamide/acrylic acid polymer containing from about 5 weight percent acrylic acid to up to 25 weight percent acrylic acid and having a molecular weight of at least 10 million, preferably at least 15 million or above.

The clarifier overflow after pH adjustment is then added to an aeration basin, which aeration basin contains biological sludges specifically nutriated and acclimated for the purpose of removing phenols and other organic matter. After treatment in the aeration basins through the natural microbiological metabolic processes on-going therein, the aeration basin outflow is added to a clarifier or a series of final clarifiers, the sludge from which is returned to the basin and the overflow from which is collected and discharged to the environment. The final overflows at that point have the following characteristics:

|  | Parts per million | pH | Temperature |
|---|---|---|---|
| Cyanide | 0.1–5 ppm | | ambient |
| Ammonia | 2.5–200 ppm | | |
| Phenols | 0.1–4.0 ppm | | |
| COD | 1,000–10,000 ppm | | |
| Thiocyanate | 250–2,500 ppm | 7.8–8.2 | |

Having described our invention, we claim:

1. A process for removing cyanide from an initial cyanide contaminated waste water containing from about 10 to about 1,000 parts per million cyanide which process comprises:
    a) adjusting the pH of said cyanide contaminated waste water in a containment vessel, with mixing, to a pH of from about 3.0 to about 5.0; while;
    b) adding thereto in the same containment vessel, an effective cyanide removing amount of a water soluble halogen-free ferric iron salt; and thereby forming a pH adjusted ferricyanide salt containing waste water; then
    c) mixing said pH adjusted, ferricyanide salt containing waste water in the containment vessel thereby forming a ferric ferricyanide precipitate containing waste liquor, and then
    d) charging the ferric ferricyanide precipitate containing waste liquor to a clarifier while adding thereto a high molecular weight water soluble polymeric flocculent, thereby forming a flocculated ferric ferricyanide containing sludge and a clarified liquor, said liquor containing no more than 20% of the cyanide contained in the initial cyanide contaminated waste water,
    e) removing said flocculated ferric ferricyanide containing sludge from said clarified liquor, and
    f) discharging said treated clarified liquor.

2. The process of claim 1 wherein the pH of initial cyanide contaminated waste water is adjusted to within about 3.5 to about 4.5 with a halogen-free inorganic acid and the ferric iron salt is ferric sulfate.

3. The process of claims 1 or 2 wherein the polymeric flocculant is an acrylamide/acrylic acid polymer having a weight average molecular weight of at least 10 million and an acrylamide to acrylic acid weight ratio of from about 99:1 to about 75:25.

4. The process of claims 1 or 2 wherein the initial cyanide contaminated waste water are obtained by spray washing off gases collected from a battery of coking ovens, forming a coke oven tar containing flushing liquor, then
    (a) separating and removing the tar therefrom to form a still liquor, then
    (b) steam stripping said still liquor while adjusting pH to from about 9.0 to about 11.0 with caustic thereby removing therefrom a portion of any ammonia, H$_2$S, HCN, and volatile organic contained therein to form a stream stripped diluted still liquor having a pH of from about 9.0–11.0 and containing from about 5 to about 150 ppm cyanide, and then
    (c) using this diluted still liquor as the initial cyanide contaminated waste water.

5. The process of claim 1 or 2 wherein the ferric iron salt is used at an effective cyanide removing amount ranging from about 0.3 pounds iron to about 1.0 pounds iron per pound cyanide present in the initial cyanide contaminated waste water.

* * * * *